(12) United States Patent
Snider et al.

(10) Patent No.: US 8,044,820 B2
(45) Date of Patent: Oct. 25, 2011

(54) METHOD AND SYSTEM FOR PERFORMING OPERATIONS AND FOR IMPROVING PRODUCTION IN WELLS

(75) Inventors: Philip M Snider, Houston, TX (US); Joseph A Zierolf, Houma, LA (US)

(73) Assignee: Marathon Oil Company, Houston, TX (US)

( * ) Notice: Subject to any disclaimer, the term of this patent is extended or adjusted under 35 U.S.C. 154(b) by 0 days.

(21) Appl. No.: 12/777,779

(22) Filed: May 11, 2010

(65) Prior Publication Data

US 2010/0219980 A1    Sep. 2, 2010

Related U.S. Application Data

(63) Continuation of application No. 12/173,693, filed on Jul. 15, 2008, now Pat. No. 7,714,741, which is a continuation of application No. 10/323,536, filed on Dec. 18, 2002, now Pat. No. 7,400,263, and a continuation of application No. 09/586,648, filed on Jun. 1, 2000, now Pat. No. 7,283,061, which is a continuation-in-part of application No. 09/286,650, filed on Apr. 6, 1999, now Pat. No. 6,333,699.

(60) Provisional application No. 60/098,284, filed on Aug. 28, 1998.

(51) Int. Cl.
*G01V 3/00* (2006.01)

(52) U.S. Cl. ............... 340/854.8; 340/572.7; 340/853.1; 340/539.1; 166/254.2; 166/255.1

(58) Field of Classification Search ............... 340/854.8, 340/572.7, 853.1, 539.1; 166/254.2, 255.1
See application file for complete search history.

(56) References Cited

U.S. PATENT DOCUMENTS 3,684,008 A    8/1972    Garrett
(Continued)

FOREIGN PATENT DOCUMENTS

EP    0013494 A1    7/1980
(Continued)

OTHER PUBLICATIONS

Den-Con Tool Co., General Catalog, 1994-95, pp. 1-3.
(Continued)

*Primary Examiner* — Albert K Wong
(74) *Attorney, Agent, or Firm* — Jack E. Ebel (57) ABSTRACT

A method for performing operations and for improving production in a well includes the steps of: providing radio identification devices at known locations in the well, and providing a reader device configured to read the identification devices, and to control the operations responsive to signals from the identification devices. The method also includes the steps of providing a process tool, and transporting the process tool and the reader device through the well. The reader device is programmed to control the process tool upon reception of a response signal from a selected identification device. The method can be used to perform perforating processes, packer setting processes, bridge plug setting processes, logging processes, inspection processes, chemical treating processes, and cleaning processes. In addition, the method can be performed dynamically by controlling the tool as it moves through the well, or statically by stopping the tool at a particular location within the well. A system for performing the method includes the identification devices, the reader device, the process tool, and a computer or controller. In addition the identification devices can be placed in casing collars of the well and can be configured as passive devices or as active devices.

20 Claims, 10 Drawing Sheets

U.S. PATENT DOCUMENTS

| | | |
|---|---|---|
| 3,706,094 A | 12/1972 | Cole et al. |
| 4,023,167 A | 5/1977 | Wahlstrom |
| 4,096,477 A | 6/1978 | Epstein et al. |
| 4,119,146 A | 10/1978 | Taylor |
| 4,166,215 A | 8/1979 | Anderson |
| 4,535,430 A | 8/1985 | Cochrane et al. |
| 4,572,293 A | 2/1986 | Wilson et al. |
| 4,599,182 A | 7/1986 | Young et al. |
| 4,622,463 A | 11/1986 | Hill |
| 4,630,044 A | 12/1986 | Polzer |
| 4,656,463 A | 4/1987 | Anders et al. |
| 4,656,944 A | 4/1987 | Gonzalez |
| 4,698,631 A | 10/1987 | Kelly, Jr. et al. |
| 4,808,925 A | 2/1989 | Baird |
| 4,827,395 A | 5/1989 | Anders et al. |
| 4,837,515 A | 6/1989 | Nishihara et al. |
| 4,977,961 A | 12/1990 | Avasthi |
| 5,029,644 A | 7/1991 | Szarka |
| 5,105,742 A | 4/1992 | Sumner |
| 5,130,705 A | 7/1992 | Allen et al. |
| 5,142,128 A | 8/1992 | Perkin et al. |
| 5,160,925 A | 11/1992 | Dailey et al. |
| 5,191,936 A | 3/1993 | Edwards et al. |
| 5,202,680 A | 4/1993 | Savage |
| 5,206,680 A | 4/1993 | Dillow |
| 5,230,387 A | 7/1993 | Waters et al. |
| 5,279,366 A | 1/1994 | Scholes |
| 5,354,956 A | 10/1994 | Orban et al. |
| 5,355,957 A | 10/1994 | Burleson et al. |
| 5,361,838 A | 11/1994 | Kilgore |
| 5,394,141 A | 2/1995 | Soulier |
| 5,457,447 A | 10/1995 | Ghaem et al. |
| 5,467,083 A | 11/1995 | McDonald et al. |
| 5,479,860 A | 1/1996 | Ellis |
| 5,495,237 A | 2/1996 | Yuasa et al. |
| 5,497,140 A | 3/1996 | Tuttle |
| 5,505,134 A | 4/1996 | Brooks et al. |
| 5,530,358 A | 6/1996 | Wisler et al. |
| 5,608,199 A | 3/1997 | Clouse, III et al. |
| 5,621,647 A | 4/1997 | Kraemer et al. |
| 5,626,192 A | 5/1997 | Connell et al. |
| 5,629,623 A | 5/1997 | Sezginer et al. |
| 5,654,693 A | 8/1997 | Cocita |
| 5,660,232 A | 8/1997 | Reinhardt |
| 5,680,459 A | 10/1997 | Hook et al. |
| 5,680,905 A | 10/1997 | Green et al. |
| 5,682,099 A | 10/1997 | Thompson et al. |
| 5,682,143 A | 10/1997 | Brady et al. |
| 5,706,896 A | 1/1998 | Tubel et al. |
| 5,720,345 A | 2/1998 | Price et al. |
| 5,829,538 A | 11/1998 | Wesson et al. |
| 5,836,406 A | 11/1998 | Schuh |
| 5,864,323 A | 1/1999 | Berthon |
| 5,877,996 A | 3/1999 | Krokstad et al. |
| 5,911,277 A | 6/1999 | Hromas et al. |
| 5,923,167 A | 7/1999 | Chang et al. |
| 5,931,239 A | 8/1999 | Schuh |
| 5,939,885 A | 8/1999 | McClure et al. |
| 5,955,666 A | 9/1999 | Mullins |
| 5,991,602 A | 11/1999 | Sturm |
| 5,995,449 A | 11/1999 | Green et al. |
| 6,018,501 A | 1/2000 | Smith et al. |
| 6,025,780 A | 2/2000 | Bowers et al. |
| 6,078,259 A | 6/2000 | Brady et al. |
| 6,081,729 A | 6/2000 | Bauerschmidt et al. |
| 6,085,805 A | 7/2000 | Bates |
| 6,097,301 A | 8/2000 | Tuttle |
| 6,105,688 A | 8/2000 | Vaynshteyn et al. |
| 6,135,206 A | 10/2000 | Gano et al. |
| 6,151,961 A | 11/2000 | Huber et al. |
| 6,158,532 A | 12/2000 | Logan et al. |
| 6,176,318 B1 | 1/2001 | Drakeley et al. |
| 6,184,685 B1 | 2/2001 | Paulk et al. |
| 6,189,621 B1 | 2/2001 | Vail, III |
| 6,243,041 B1 | 6/2001 | Mischenko et al. |
| 6,249,258 B1 | 6/2001 | Bloch et al. |
| 6,253,842 B1 | 7/2001 | Connell et al. |
| 6,257,338 B1 | 7/2001 | Kilgore |
| 6,288,548 B1 | 9/2001 | Thompson et al. |
| 6,288,685 B1 | 9/2001 | Thomas |
| 6,324,904 B1 | 12/2001 | Ishikawa et al. |
| 6,333,699 B1 | 12/2001 | Zierolf |
| 6,333,700 B1 | 12/2001 | Thomeer et al. |
| 6,343,649 B1 | 2/2002 | Beck et al. |
| 6,359,569 B2 | 3/2002 | Beck et al. |
| 6,366,089 B1 | 4/2002 | Poitzsch et al. |
| 6,426,917 B1 | 7/2002 | Tabanou et al. |
| 6,429,653 B1 | 8/2002 | Kruspe et al. |
| 6,443,228 B1 | 9/2002 | Aronstam et al. |
| 6,450,258 B2 | 9/2002 | Green et al. |
| 6,476,609 B1 | 11/2002 | Bittar |
| 6,481,505 B2 | 11/2002 | Beck et al. |
| 6,497,280 B2 | 12/2002 | Beck et al. |
| 6,515,919 B1 | 2/2003 | Lee |
| 6,531,871 B1 | 3/2003 | Hay et al. |
| 6,536,524 B1 | 3/2003 | Snider |
| 6,575,237 B2 | 6/2003 | Purkis et al. |
| 6,577,244 B1 | 6/2003 | Clark et al. |
| 6,588,505 B2 | 7/2003 | Beck et al. |
| 6,597,175 B1 | 7/2003 | Brisco |
| 6,614,229 B1 | 9/2003 | Clark et al. |
| 6,717,501 B2 | 4/2004 | Hall et al. |
| 6,759,968 B2 | 7/2004 | Zierolf |
| 6,761,219 B2 | 7/2004 | Snider et al. |
| 6,766,703 B1 | 7/2004 | Kluth et al. |
| 6,788,263 B2 | 9/2004 | Clark et al. |
| 6,822,579 B2 | 11/2004 | Goswami et al. |
| 6,915,848 B2 | 7/2005 | Thomeer et al. |
| 6,943,697 B2 | 9/2005 | Ciglenec et al. |
| 6,989,764 B2 | 1/2006 | Thomeer et al. |
| 7,014,100 B2 | 3/2006 | Zierolf |
| 7,063,148 B2 | 6/2006 | Jabusch |
| 7,159,654 B2 | 1/2007 | Ellison et al. |
| 7,268,688 B2 | 9/2007 | Juds |
| 7,283,061 B1 * | 10/2007 | Snider et al. ............... 340/854.8 |
| 7,400,263 B2 | 7/2008 | Snider et al. |
| 7,677,439 B2 | 3/2010 | Zierolf |
| 7,714,741 B2 | 5/2010 | Snider et al. |
| 2001/0013410 A1 | 8/2001 | Beck et al. |
| 2001/0013411 A1 | 8/2001 | Beck et al. |
| 2001/0042617 A1 | 11/2001 | Beck et al. |
| 2001/0043146 A1 | 11/2001 | Beck et al. |
| 2001/0054969 A1 | 12/2001 | Thomeer et al. |
| 2002/0007949 A1 | 1/2002 | Tolman et al. |
| 2002/0014966 A1 | 2/2002 | Strassner et al. |
| 2002/0093431 A1 | 7/2002 | Zierolf |
| 2002/0133942 A1 | 9/2002 | Kenison et al. |
| 2002/0158120 A1 | 10/2002 | Zierolf |
| 2003/0058125 A1 | 3/2003 | Ciglenec et al. |
| 2003/0090390 A1 | 5/2003 | Snider et al. |
| 2004/0211567 A1 | 10/2004 | Aud |
| 2004/0239521 A1 | 12/2004 | Zierolf |
| 2005/0115708 A1 | 6/2005 | Jabusch |
| 2005/0237200 A1 | 10/2005 | Bellum et al. |
| 2006/0175404 A1 | 8/2006 | Zierolf |
| 2008/0271887 A1 | 11/2008 | Snider et al. |
| 2009/0223663 A1 | 9/2009 | Snider et al. |
| 2009/0223670 A1 | 9/2009 | Snider |
| 2010/0013664 A1 | 1/2010 | Zierolf |
| 2010/0171593 A1 | 7/2010 | Zierolf |

FOREIGN PATENT DOCUMENTS

| | | |
|---|---|---|
| EP | 0412535 B1 | 2/1991 |
| EP | 0651132 A2 | 5/1995 |
| EP | 0730083 A2 | 9/1996 |
| FR | 1033631 | 7/1953 |
| SU | 1657627 A1 | 6/1991 |
| WO | 2001/18357 A2 | 3/2001 |
| WO | 2001/73423 A1 | 10/2001 |
| WO | 2009/114356 A1 | 9/2009 |

OTHER PUBLICATIONS

Varpakhovich G A; RU2057334C1: Method of Identification of Objects and Plant for its Realization; Mar. 27, 1996; pp. 1-2; Derwent Record.

U.S. Office Communication from U.S. Appl. No. 09/586,648 dated Dec. 18, 2003.

U.S. Office Communication from U.S. Appl. No. 09/586,648 dated Aug. 26, 2004.
U.S. Notice of Allowance from U.S. Appl. No. 09/586,648 dated Sep. 29, 2005.
U.S. Office Communication from U.S. Appl. No. 10/323,536 dated Dec. 27, 2006.
U.S. Office Communication from U.S. Appl. No. 10/323,536 dated May 14, 2007.
U.S. Notice of Allowance from U.S. Appl. No. 10/323,536 dated Feb. 5, 2008.
U.S. Supplemental Notice of Allowance from U.S. Appl. No. 10/323,536 dated Apr. 11, 2008.
U.S. Office Communication from U.S. Appl. No. 12/173,693 dated Feb. 25, 2009.
U.S. Office Communication from U.S. Appl. No. 12/173,693 dated Jun. 4, 2009.
U.S. Notice of Allowability from U.S. Appl. No. 12/173,693 dated Aug. 21, 2009.
U.S. Office Communication from U.S. Appl. No. 09/843,998 dated Aug. 29, 2002.
U.S. Office Communication from U.S. Appl. No. 09/843,998 dated Mar. 28, 2003.
U.S. Office Communication from U.S. Appl. No. 09/843,998 dated Dec. 9, 2003.
U.S. Office Communication from U.S. Appl. No. 09/843,998 dated Jul. 28, 2004.
U.S. Office Communication from U.S. Appl. No. 09/843,998 dated Mar. 24, 2005.
U.S. Office Communication from U.S. Appl. No. 11/377,736 dated Oct. 18, 2006.
U.S. Office Communication from U.S. Appl. No. 11/377,736 dated May 7, 2007.
U.S. Office Communication from U.S. Appl. No. 11/377,736 dated Nov. 1, 2007.
U.S. Office Communication from U.S. Appl. No. 11/377,736 dated Jun. 12, 2008.
U.S. Office Communication from U.S. Appl. No. 11/377,736 dated Dec. 12, 2008.
U.S. Office Communication from U.S. Appl. No. 11/377,736 dated May 29, 2009.
U.S. Notice of Allowability from U.S. Appl. No. 09/286,650 dated Jul. 3, 2000.
U.S. Notice of Allowability from U.S. Appl. No. 09/286,650 dated Jan. 12, 2001.
U.S. Supplemental Notice of Allowability from U.S. Appl. No. 09/286,650 dated Oct. 12, 2001.
U.S. Office Communication from U.S. Appl. No. 09/656,720 dated Feb. 26, 2002.
U.S. Office Communication from U.S. Appl. No. 10/032,114 dated Aug. 13, 2003.
U.S. Notice of Allowability from U.S. Appl. No. 10/032,114 dated Feb. 24, 2004.
U.S. Office Communication from U.S. Appl. No. 10/887,366 dated Dec. 5, 2006.
U.S. Office Communication from U.S. Appl. No. 10/887,366 dated May 17, 2007.
U.S. Office Communication from U.S. Appl. No. 10/887,366 dated Aug. 21, 2007.
U.S. Office Communication from U.S. Appl. No. 10/887,366 dated Nov. 23, 2007.
U.S. Office Communication from U.S. Appl. No. 10/887,366 dated Jun. 18, 2008.
U.S. Office Communication from U.S. Appl. No. 10/887,366 dated Nov. 10, 2008.
U.S. Office Communication from U.S. Appl. No. 10/887,366 dated Apr. 22, 2009.
U.S. Office Communication from U.S. Appl. No. 10/726,027 dated Jul. 11, 2005.
U.S. Office Communication from U.S. Appl. No. 12/044,087 dated Apr. 22, 2010.
U.S. Office Communication from U.S. Appl. No. 12/044,087 dated Jul. 30, 2010.
U.S. Office Communication from U.S. Appl. No. 12/102,687 dated Aug. 2, 2010.
U.S. Office Communication from U.S. Appl. No. 12/725,254 dated Jun. 4, 2010.
U.S. Office Communication from U.S. Appl. No. 12/044,087 dated Jan. 13, 2011.
U.S. Office Communication from U.S. Appl. No. 12/102,687 dated Nov. 5, 2010.
U.S. Office Communication from U.S. Appl. No. 12/725,254 dated Nov. 2, 2010.
U.S. Office Communication from U.S. Appl. No. 12/044,087 dated May 24, 2011.

* cited by examiner

METHOD AND SYSTEM FOR PERFORMING OPERATIONS AND FOR IMPROVING PRODUCTION IN WELLS

CROSS REFERENCE TO RELATED APPLICATIONS

This application is a continuation of U.S. patent application Ser. No. 12/173,693 which is a continuation of U.S. patent application Ser. No. 10/323,536 filed on Dec. 18, 2002, now U.S. Pat. No. 7,400,263, which is a continuation of U.S. patent application Ser. No. 09/586,648, filed on Jun. 1, 2000, now U.S. Pat. No. 7,283,061 which is a continuation-in-part of patent application Ser. No. 09/286,650 filed Apr. 6, 1999, now U.S. Pat. No. 6,333,699, which claims the benefit of U.S. Provisional Patent Application Ser. No. 60/098,284, filed on Aug. 28, 1998, now abandoned.

FIELD OF THE INVENTION

This invention relates to generally to wells used in the production of fluids such as oil and gas. More specifically, this invention relates to a method and system for performing various operations and for improving production in wells.

BACKGROUND OF THE INVENTION

Different operations are performed during the drilling and completion of a subterranean well, and also during the production of fluids from subterranean formations via the completed well. For example, different downhole operations are typically performed at some depth within the well, but are controlled at the surface.

A perforating process is one type of downhole operation that is used to perforate a well casing. A conventional perforating process is performed by placing a perforating tool (i.e., perforating gun) in a well casing, along a section of the casing proximate to a geological formation of interest. The perforating tool carries shaped charges that are detonated using a signal transmitted from the surface to the charges. Detonation of the charges creates openings in the casing and concrete around the casing, which are then used to establish fluid communication between the geological formation, and the inside diameter of the casing.

Another example of a downhole operation is the setting of packers within the well casing to isolate a particular section of the well or a particular geological formation. In this case, a packer can be placed within the well casing at a desired depth, and then set by a setting tool actuated from the surface. Other exemplary downhole operations include the placement of logging tools at a particular geological formation or depth within the well casing, and the placement of bridge plugs, casing patches, tubulars, and associated tools in the well casing.

One critical aspect of any downhole operation involves ascertaining the depth in the well where the operation is to be performed. The depth is typically ascertained using well logs. A conventional well log includes continuous readings from a logging instrument, and an axis which represents the well depths at which the readings were obtained. The instrument readings measure rock characteristics such as natural gamma ray radiation, electrical resistivity, density and acoustic properties. Using these rock characteristics geological formations of interest within the well, such as oil and gas bearing formations, can be identified. The well is initially logged "open hole" which becomes the bench mark for all future logs. After the well is cased, a cased hole log is then prepared and correlated, or "tied in", to the open hole log.

Using the logs and a positioning mechanism, such as a wire line or coiled tubing, coupled to an odometer, a tool can be placed at a desired depth within the well, and then actuated as required to perform the downhole operation. One problem with conventional logging and positioning techniques is that it is difficult to accurately identify the depth of the tool, and to correlate the depth to the open hole logs.

Figure 1:
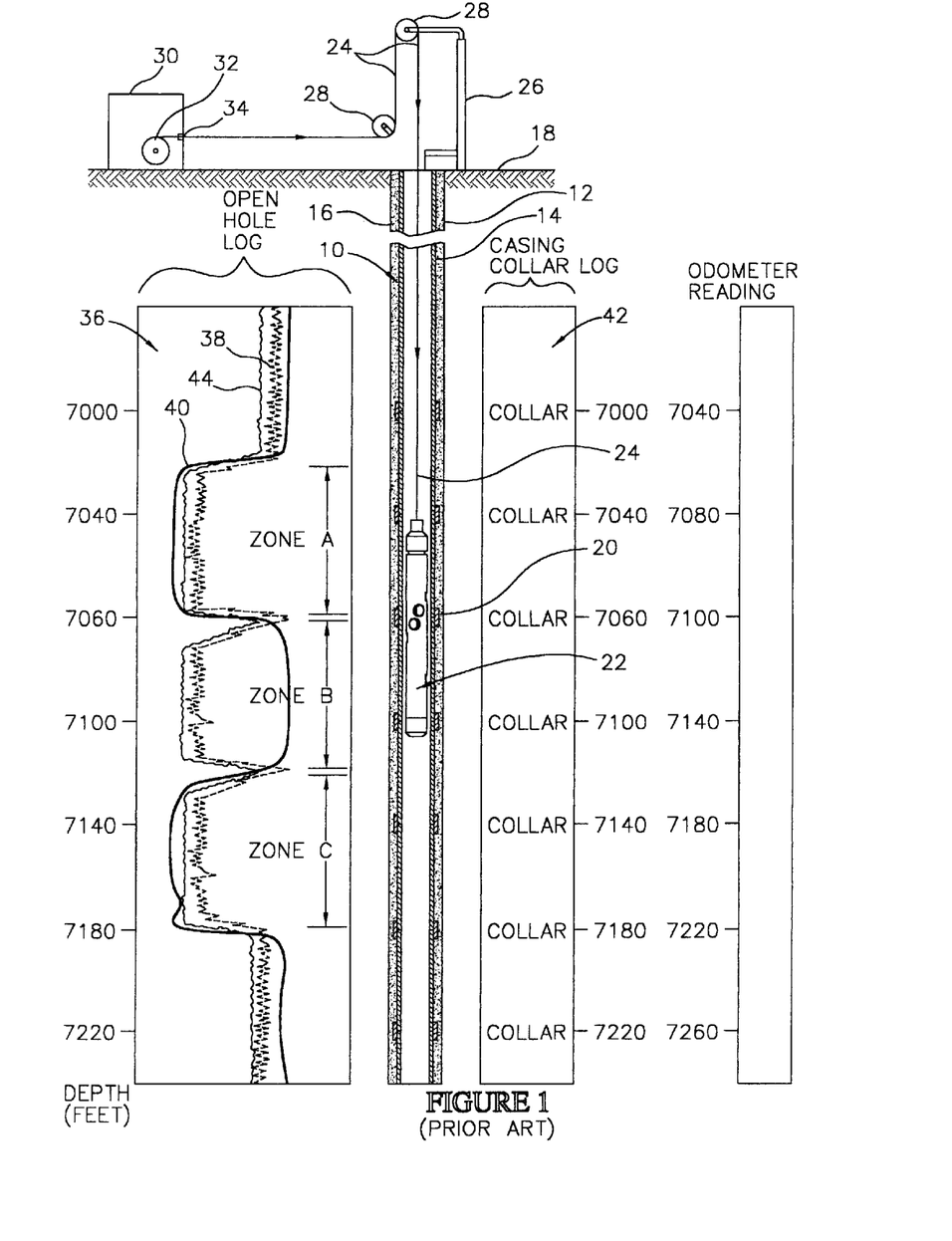
FIG. 1 is a schematic diagram of a prior art downhole operation being performed using well logs and odometer readings from a tool positioning mechanism.

FIG. 1 illustrates a prior art perforating process being performed in an oil and gas well 10. The well 10 includes a well bore 12, and a casing 14 within the well bore 12 surrounded by concrete 16. The well 10 extends from an earthen surface 18 through geological formations within the earth, which are represented as Zones A, B and C. The casing 14 is formed by tubular elements, such as pipe or tubing sections, connected to one another by collars 20. In this example the tubular elements that form the casing 14 are about 40 feet long so that the casing collars 20 are forty feet apart. However, tubular elements with shorter lengths (e.g., twenty feet) can be interspersed with the forty feet lengths to aid in depth determinations. Thus in FIG. 1 two of the casing collars 20 are only twenty feet apart.

For performing the perforating operation a perforating tool 22 has been lowered into the casing 14 on a wire line 24. A mast 26 and pulleys 28 support the wire line 24, and a wire line unit 30 controls the wire line 24. The wire line unit 30 includes a drive mechanism 32 that lowers the wire line 24 and the tool 22 into the well 10, and raises the wire line 24 and the tool 22 out of the well 10 at the completion of the process. The wire line unit 30 also includes an odometer 34 that measures the unwound length of the wire line 24 as it is lowered into the well 10, and equates this measurement to the depth of the tool 22 within the well.

During formation of the well 10 an open hole log 36 was prepared. The open hole log 36 includes various instrument readings, such as gamma ray readings 38 and spontaneous potential (SP) readings 40 which are plotted as a function of depth in feet. For simplicity only a portion of the open hole log 36, from about 7000 feet to about 7220 feet, is illustrated. However, in actual practice the entire well 10 from the surface 18 to the bottom of the well 10 may be logged. The open hole log 36 permits skilled artisans to ascertain the oil and gas containing formations within the well 10 and the most productive intervals of those formations. For example, based on the gamma ray readings 38 and the SP readings 40 it is determined that Zone A may contain oil and gas reserves. It is thus desired to perforate the casing 14 along a section thereof proximate to Zone A.

In addition to the open hole log 36, following casing of the well 10, cased hole gamma ray readings 44 are made, and a casing collar log 42 can be prepared. The casing collar log 42 is also referred to as a PDC log (perforating depth control log). The casing collar log 42 can be used to identify the section of the casing 14 proximate to Zone A where the perforations are to be made.

Using techniques and equipment that are known in the art, the casing collar log 42 can be accurately correlated, or "tied in", to the open hole log 36. However, using conventional positioning mechanisms, such as the wire line unit 30, it may be difficult to accurately place the perforating tool 22 at the required depth within the well. For example, factors such as stretching, elongation from thermal effects, sinusoidal and helical buckling, and deformation of the wire line 24 can affect the odometer readings, and the accuracy of the odometer readings relative to the open hole odometer readings.

Thus, as shown in FIG. 1, the odometer readings which indicate the depth of the perforating tool 22, may not equate to the actual depths, as reflected in the open hole log 36 and the casing collar log 42. In this example, the odometer readings differ from the depths identified in the open hole log 36 and the casing collar log 42 by about 40 feet. With this situation, when the perforating tool 22 is fired, the section of casing 20 proximate to Zone A may be only partially perforated, or not perforated at all.

Because of these tool positioning inaccuracies, various correlative joint logging and wire logging techniques have been developed in the art. For example, one prior art technique uses electronic joint sensors, and electrically conductive wire line, to determine joint-to-joint lengths, and to correlate the odometer readings of the wire line to the casing collar log. Although these correlative joint logging and wire line logging techniques are accurate, they are expensive and time consuming. In particular, additional crews and surface equipment are required, and additional wire line footage charges are incurred.

In addition to tool positioning inaccuracies, computational errors also introduce inaccuracies in depth computations. For example, a tool operator can make computational errors by thinking one number (e.g., 7100), while the true number may be different (e.g., 7010). Also, the tool operator may position the tool by compensating a desired amount in the uphole direction, when in reality the downhole direction should have been used. These computational errors are compounded by fatigue, the weather, and communication problems at the well site.

It would be desirable to obtain accurate depth readings for downhole tools without the necessity for complicated and expensive correlative joint logging and wire logging techniques. In addition, it would be desirable to control down hole operations and processes without having to rely on inaccurate depth readings contaminated by computational errors. The present invention is directed to an improved method and system for performing operations and processes in wells, in which the depths of down hole tools are accurately ascertained and used to control the operations and processes.

Another limitation of conventional downhole operations that are dependent on depth measurements, is that downhole tools must first be positioned in the well, and then actuated from the surface. This requires additional time and effort from well crews. In addition, surface actuation introduces additional equipment and variables to the operations. It would be advantageous to be able to control downhole operations without the requirement of surface actuation of the downhole tools. With the present invention actuation of downhole tools can be performed in the well at the required depth.

SUMMARY OF THE INVENTION

In accordance with the present invention a method and a system for performing various operations in wells, and for improving production in wells, are provided. Exemplary operations that can be performed using the method include perforating processes, packer setting processes, bridge plug setting processes, logging processes, inspection processes, chemical treating processes, casing patch processes, jet cutting processes and cleaning processes. Each of these processes, when performed in a well according to the method, improves the well and improves production from the well.

In an illustrative embodiment the method is used to perform a perforating process in an oil or gas production well. The well includes a well bore, and a well casing, extending from an earthen or subsea surface into various geological zones within the earth. The well casing includes lengths of pipe or tubing joined together by casing collars.

The method includes the initial step of providing identification devices at spaced intervals along the length of the well casing. The identification devices can comprise active or passive radio identification devices installed in each casing collar of the well casing. Each radio identification device is uniquely identified, and its depth, or location, within the well is accurately ascertained by correlation to well logs. Similarly, each casing collar is uniquely identified by the radio identification device contained therein, and a record of the well including the depth of each casing collar and identification device is established.

The method also includes the step of providing a reader device, and a transport mechanism for moving the reader device through the well casing proximate to the identification devices. In the illustrative embodiment the reader device comprises a radio frequency transmitter and receiver configured to provide transmission signals for reception by the identification devices. The identification devices are configured to receive the transmission signals, and to transmit response signals back to the reader device. The transport mechanism for the reader device can comprise a wire line, tubulars, coil tubing, a robotic mechanism, a fluid transport mechanism such as a pump or a blower, a free fall arrangement, or a controlled fall arrangement such as a parachute.

In addition to transmitting and receiving signals from the identification devices, the reader device is also configured to transmit control signals for controlling a process tool, as a function of the response signals from the identification devices. For example, the reader device can control a perforating tool configured to perforate the well casing. Specifically, the reader device and the perforating tool can be transported together through the well casing past the identification devices. In addition, the reader device can be programmed to transmit the control signal to detonate the perforating tool, upon reception of a response signal from an identification device located at a predetermined depth or location within the well. Stated differently, the reader device can be programmed to control the perforating tool responsive to locating a specific identification device.

As other examples, the reader device can be configured to control setting tools for packers, bridge plugs or casing patches, to control instrument readings from logging tools, and to control jet cutters and similar tools. With the method of the invention the true depth of the process tool can be ascertained in real time by the reader device using response signals from the identification devices. Accordingly, there is no need to ascertain the depth of the tool using an odometer, and expensive wire logging techniques. In addition, operator computational errors are reduced because true depth readings can be provided without the requirement of additional computations. Further, for some processes, there is no need to transmit signals to the surface, as the reader device can be programmed to control the process in situ within the well.

However, it is to be understood that the method of the invention can also be practiced by transmission of the control signals from the reader device to a controller or computer at the surface, and control of the process tool by the controller or computer. In addition, control of the process tool can be performed dynamically as the process tool moves through the well with the reader device, or statically by stopping the process tool at a required depth. Further, the method of the invention can be used to control a multi stage process, or to control a tool configured to perform multiple processes. For example, a combination packer setting and perforating tool can be configured to perform packer setting and perforating processes, as a function of true depth readings obtained using the method of the invention.

In the illustrative embodiment the system includes the identification devices installed in casing collars at spaced intervals along the well casing. The identification devices include a programmable element, such as a transceiver chip for receiving and storing identification information, such as casing collar and depth designations. Each identification device can be configured as a passive device, an active device having an antenna, or a passive device which can be placed in an active state by transmission of signals through well fluids.

The system also includes the reader device and the process tool configured for transport through the well casing. In addition to the transmitter and receiver, the reader device includes one or more programmable memory devices, such as semiconductor chips configured to receive and store information. The reader device also includes a power source such as a power line to the surface, or a battery. In addition, the reader device includes a telemetry circuit for transmitting the control signals, which can be used to control the process tool, and to provide depth and other information to operators and equipment at the surface. The system can also include a computer configured to receive and process the control signals, and to provide and store information in visual or other form for well operators and equipment. Further, the system can include a controller configured to process the control signals for controlling the process tool and various process equipment. The controller can be located at the surface, or on the process tool, to provide a self contained system. Also, the system can be transported to a well site in the form of a kit, and then assembled at the well site.

DETAILED DESCRIPTION OF THE PREFERRED EMBODIMENT

Figure 2:
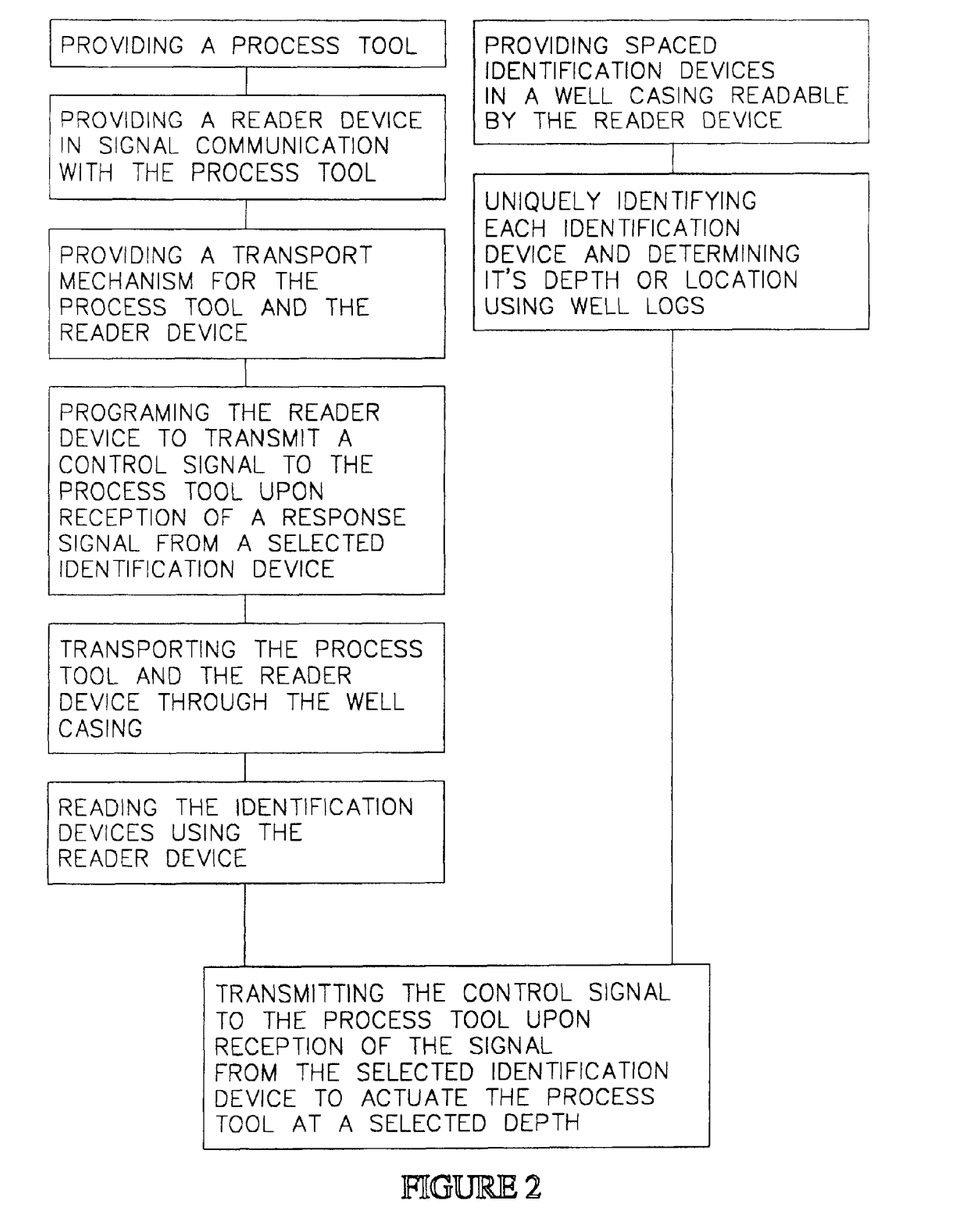
FIG. 2 is a flow diagram illustrating steps in the method of the invention for controlling a perforating process in a well.

Referring to FIG. 2, broad steps in a method for controlling an operation or process in a subterranean well in accordance with the invention are illustrated. The method, broadly stated, includes the steps of:

A. Providing a process tool.

B. Providing a reader device in signal communication with the process tool.

C. Providing a transport mechanism for the process tool and the reader device.

D. Providing spaced identification devices in a well casing readable by the reader device.

E. Uniquely identifying each identification device and determining its depth, or location, in the well using well logs.

F. Programming the reader device to transmit a control signal to the process tool upon reception of a response signal from a selected identification device.

G. Transporting the process tool and the reader device through the well casing.

H. Reading the identification devices using the reader device.

I. Transmitting the control signal to the process tool upon reception of the signal from the selected identification device to actuate the process tool at a selected depth.

Referring to FIGS. 3A-3D, a system 50 constructed in accordance with the invention is illustrated. The system 50 is installed in a subterranean well 52, such as an oil and gas production well. In this embodiment the system 50 is configured to perform a perforating process in the well 52. The perforating process performed in accordance with the invention provides an improved well 52, and improves production from the well 52.

Figure 3A:
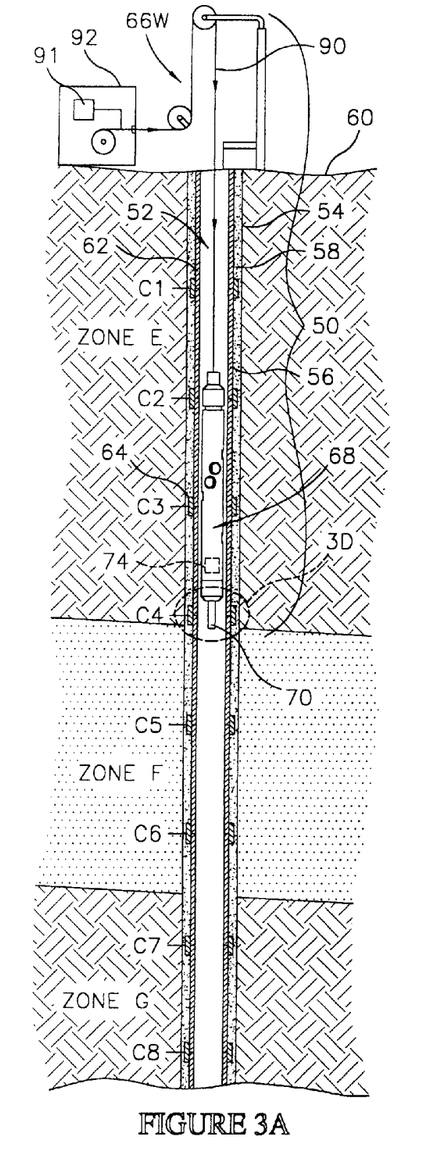
FIGS. 3A and 3B are schematic cross sectional views illustrating a system constructed in accordance with the invention for performing the perforating process.
Figure 3B:
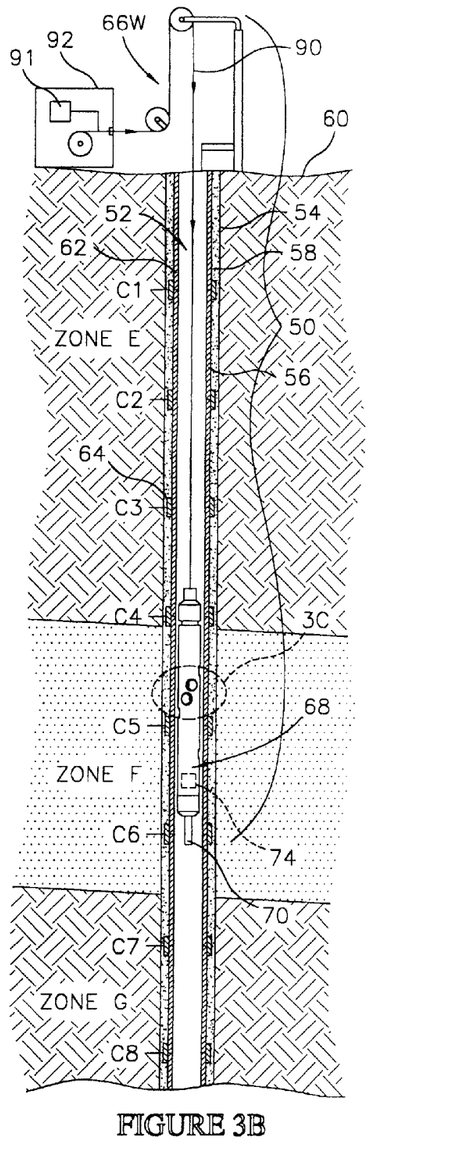

The well 52 includes a well bore 54, and a well casing 56 within the well bore 54 surrounded by concrete 56. The well 52 extends from an earthen surface 60 through geological formations within the earth, which are represented as Zones E, F and G. The earthen surface 60 can be the ground, or alternately a structure, such as an oil platform located above water. In the illustrative embodiment, the well 52 extends generally vertically from the surface 60 through Zones E, F, and G. However, it is to be understood that the method can also be practiced on inclined wells, and on horizontal wells.

The well casing 56 comprises a plurality of tubular elements 62, such as lengths of metal pipe or tubing, connected to one another by collars 64. The casing 56 includes an inside diameter adapted to transmit fluids into, or out of, the well 52, and an outside diameter surrounded by the concrete 58. The collars 64 can comprise couplings having female threads adapted for mating engagement with male threads on the tubular elements 62. Alternately, the collars 64 can comprise weldable couplings adapted for welding to the tubular elements 62.

Also in the illustrative embodiment the casing 56 is illustrated as having the same outside diameter and inside diameter throughout its length. However, it is to be understood that the casing 56 can vary in size at different depths in the well 52, as would occur by assembling tubulars with different diameters. For example, the casing 56 can comprise a telescoping structure in which the size thereof decreases with increasing depth.

Based on an open hole well log (36-FIG. 1), or other information, it is determined that Zone F of the well 52 may contain oil and gas. It is thus desired to perforate the casing 56 proximate to Zone F to establish fluid communication between Zone F, and the inside diameter of the well casing 56.

For performing the perforating process, the system 50 includes a perforating tool 68, and a reader device 70 in signal communication with the perforating tool 68. The system 50 also includes a plurality of identification devices 72 (FIG. 3D) attached to the collars 64 on the casing 56, and readable by the reader device 70. In addition, the system 50 includes a transport mechanism 66W for transporting the perforating tool 68 and the reader device 70 through the well casing 56 to Zone F. If desired, the system 50 can be transported to the well 52 as a kit, and then assembled at the well 52.

Figure 3C:
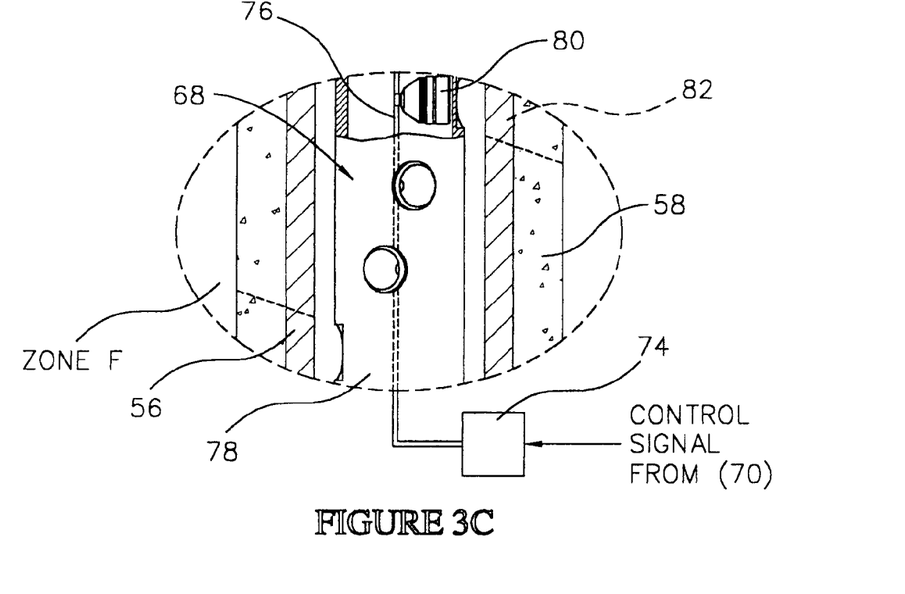
FIG. 3C is an enlarged portion of FIG. 3B, taken along section line 3C, illustrating a perforating tool of the system.

As shown in FIG. 3C, the perforating tool 68 includes a detonator 74 (illustrated schematically) and a detonator cord 76 in signal communication with the detonator 74. The detonator 74 can comprise a commercially available impact or electrical detonator configured for actuation by a signal from the reader device 70. Similarly, the detonator cord 76 can comprise a commercially available component. The detonator 74 and the detonator cord 76 are configured to generate and apply a threshold detonating energy to initiate a detonation sequence of the perforating tool 68. In the illustrative embodiment, the detonator 74 is located on, or within, the perforating tool 68.

As shown in FIG. 3C, the perforating tool 68 also includes one or more charge carriers 78 each of which comprises a plurality of charge assemblies 80. The charge carriers 78 and charge assemblies 80 can be similar to, or constructed from, commercially available perforating guns. Upon detonation, each charge assembly 80 is adapted to blast an opening 82 through the casing 56 and the concrete 58, and into the rock or other material that forms Zone F.

Figure 3D:
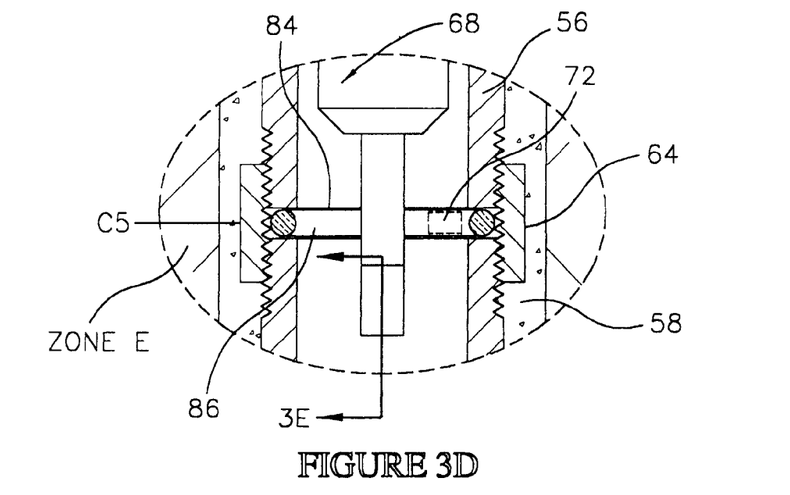
FIG. 3D is an enlarged portion of FIG. 3A, taken along section line 3D, illustrating a reader device and an identification device of the system.

As shown in FIG. 3D, each collar 64 includes an identification device 72. Each identification device 72 can be attached to a resilient o-ring 86 placed in a groove 84 within each collar 64.

In the illustrative embodiment, the identification devices 72 comprise passive radio identification devices (PRIDs). PRIDs are commercially available and are widely used in applications such as to identify merchandise in retail stores, and books in libraries. The PRIDs include a circuit which is configured to resonate upon reception of radio frequency energy from a radio transmission of appropriate frequency and strength. Passive PRIDs do not require a power source, as the energy received from the transmission signal provides the power for the PRIDs to transmit a reply signal during reception of the transmission signal.

The identification device 72 includes an integrated circuit chip, such as a transceiver chip, having memory storage capabilities. The integrated circuit chip can be configured to receive RF signals and to encode and store data based on the signals. During a data encoding operation each identification device 72 can be uniquely identified such that each collar 64 is also uniquely identified. This identification information is indicated by the C1-C8 designations in FIGS. 3A and 3B. In addition, the depth of each collar 64 can be ascertained using well logs, as previously explained and shown in FIG. 1. The depth information can then be correlated to the identification information encoded into the identification device 72. A record can thus be established identifying each collar 64 and its true depth in the well 52.

Figure 3E:
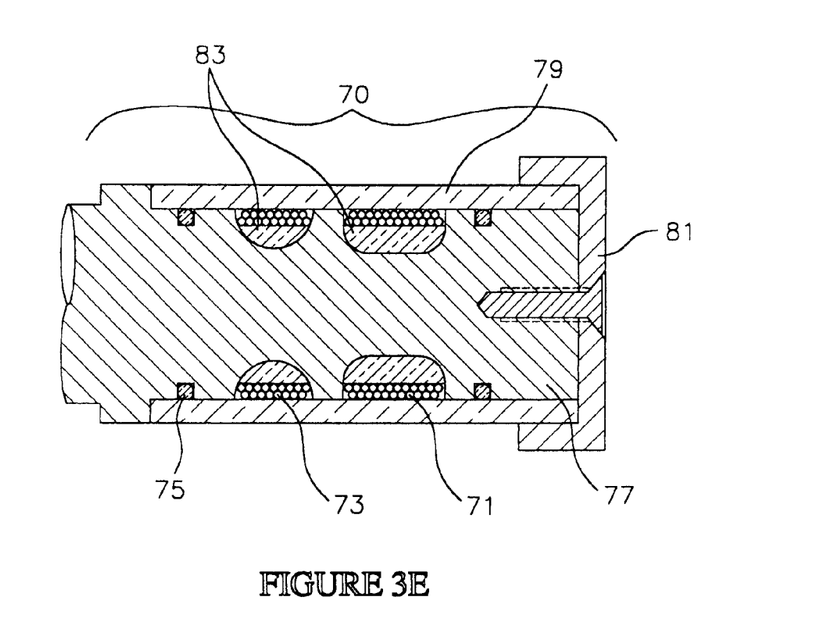
FIG. 3E is an enlarged cross sectional view taken along section line 3E of FIG. 3D illustrating a portion of the reader device.
Figure 3F:
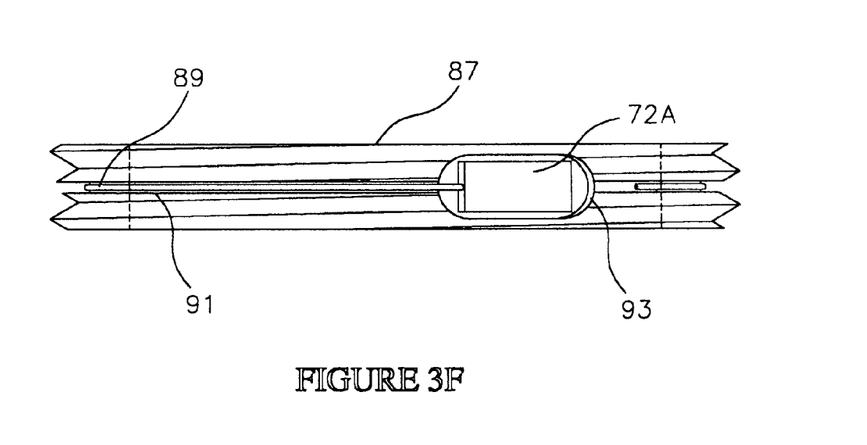
FIG. 3F is a side elevation view of an alternate embodiment active reader device and threaded mounting device.

Alternately, as shown in FIG. 3F, identification device 72A can be in the form of an active device having a separate power source such as a battery. In addition, the identification device 72A can include an antenna 89 for transmitting signals. Alternately, an identification device (not shown) can be configured to transmit signals through a well fluid or other transmission medium within the well 52. Such an identification device is further described in previously cited parent application Ser. No. 09/286,650, which is incorporated herein by reference.

As also shown in FIG. 3F, the identification device 72A can be contained in a threaded mounting device 87. The threaded mounting device 87 can comprise a rigid, non-conductive material such as a plastic. The threaded mounting device 87 is configured to be screwed into the middle portions of the casing collar 64 (FIG. 3D), and to be retained between adjacent tubular elements of the casing 56. The threaded mounting device 87 includes a circumferential groove 91 for the antenna 89, and a recess 93 for the identification device 72A. If desired, the antenna 89 and the identification device 72A can be retained in the groove 91 and the recess 93 using an adhesive or a suitable fastener.

Referring to FIG. 3E, the reader device 70 is shown in greater detail. The reader device 70 is configured to transmit RF transmission signals at a selected frequency to the identification devices 72, and to receive RF response signals from the identification devices 72. As such, the reader device 70 includes a base member 77 having a transmitter 73 configured to transmit transmission signals of a first frequency to the identification devices 72. The reader device 70 includes a receiver 71 on the base member 77 configured to receive signals of a second frequency from the identification devices 72.

Preferably, the transmitter 73 is configured to provide relatively weak transmission signals such that only an identification device 72 within a close proximity (e.g., one foot) of the reader device 70 receives the transmission signals. Alternately, the antenna of the reader device 70 can be configured to provide highly directional transmission signals such that the transmission signals radiate essentially horizontally from the reader device 70. Accordingly, the transmission signals from the reader device 70 are only received by a single identification device 72 as the reader devices passes in close proximity to the single identification device 72.

In addition to the transmitter 73 and the receiver 71, the reader device 70 includes a cover 79 made of an electrically non-conductive material, such as plastic or fiberglass. The reader device 70 also includes o-rings 75 on the base member 77 for sealing the cover 79, and a cap member 81 attached to the base member 77 which secures the cover 79 on the base member 77. In addition, the reader device 70 includes spacer elements 83 formed of an electrically non-conductive material such as ferrite, ceramic or plastic, which separate the transmitter 73 and the receiver 71 from the base member 77. In the illustrative embodiment, the base member 77 is generally cylindrical in shape, and the spacer elements 83 comprise donuts with a half moon or contoured cross section.

Figure 4A:
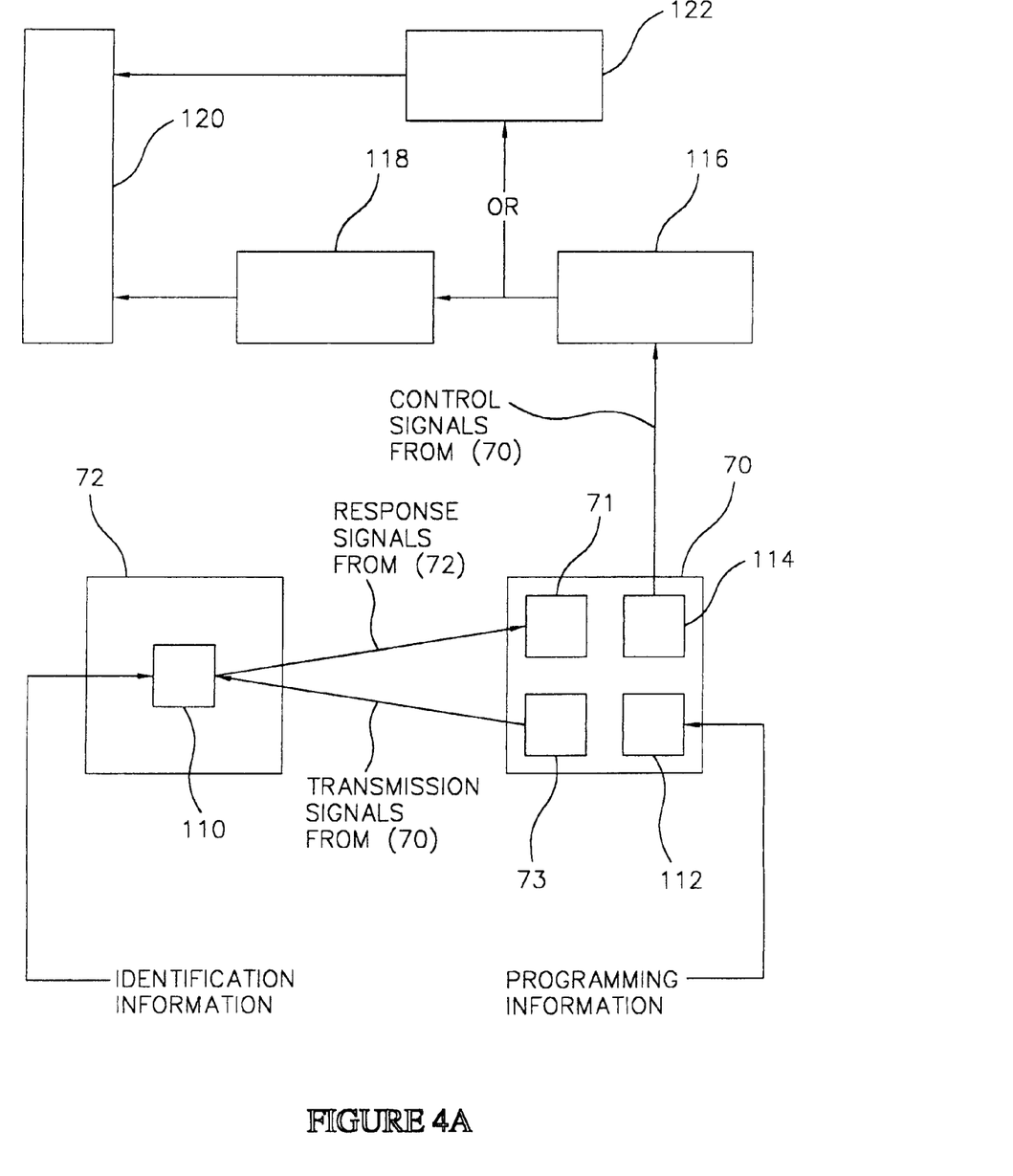
FIG. 4A is an electrical schematic for the system.

Referring to FIG. 4A, an electrical schematic for the system 50 is illustrated. As illustrated schematically, each identification device 72 includes a memory device 110, in the form of a programmable integrated circuit chip, such as a transceiver chip, configured to receive and store identification information. As previously explained, the identification information can uniquely identify each casing collar 64 with an alpha numerical, numerical or other designator. In addition, using previously prepared well logs, the depth of each uniquely identified casing collar 64 can be ascertained.

As also shown in FIG. 4A, the reader device 70 includes the transmitter 73 for transmitting transmission signals to the identification devices 72, and the receiver 71 for receiving the response signals from the identification devices 72. The reader device 70 can be powered by a suitable power source, such as a battery, or a power supply at the surface. In addition, the reader device 70 includes a memory device 112, such as one or more integrated circuit chips, configured to receive and store programming information. The reader device 70 also includes a telemetry circuit 114 configured to transmit control signals in digital or other form, through software 116 to a controller 118, or alternately to a computer 122.

As is apparent the software 116 can be included in the controller 118, or in the computer 122. In addition, the computer 122 can comprise a portable device such as a lap top which can be pre-programmed and transported to the well site. Also, as will be further explained, the computer 122 can include a visual display for displaying information received from the reader device 70. The controller 118, or the computer 122, interface with tool control circuitry 120, which is configured to control the perforating tool 68 as required.

In the illustrative embodiment, the tool control circuitry 120 is in signal communication with the detonator 74 (FIG. 3C) of the perforating tool 68. The tool control circuitry 120 can be located on the perforating tool 68, on the reader device 70, or at the surface. The reader device 70 is programmed to transmit control signals to the tool control circuitry 120, as a function of response signals received from the identification devices 72. For example, in the perforating process illustrated in FIGS. 3A and 3B, coupling C4 is located proximate to the upper level, or entry point into Zone F. Since it is desired to actuate the perforating tool 68 while it is in Zone F, the reader device 70 can be programmed to transmit actuation control signals through the tool control circuitry 120 to the detonator 74 (FIG. 3C), when it passes coupling C4 and receives response signals from the identification device 72 contained in coupling C4. Because coupling is uniquely identified by the identification device 72 contained therein, and the depth of coupling C4 has been previously identified using well logs, the perforating process can be initiated in real time, as the perforating tool 68 passes coupling C4 and enters the section of the well casing 56 proximate to Zone F.

However, in order to insure that the detonation sequence is initiated at the right time additional factors must be considered. For example, the perforating tool 68 and reader device 70 can be transported through the well casing 56 with a certain velocity (V). In addition, the reader device 70 requires a certain time period (T1) to transmit transmission signals to the identification device 72 in coupling C4, and to receive response signals from the identification device 72 in coupling C4. In addition, a certain time period (T2) is required for transmitting signals to the tool control circuitry 120 and to the detonator 74 (FIG. 3C). Further, the charge assemblies 80 require a certain time period (T3) before detonation, explosion and perforation of the casing 56 occur. All of these factors can be considered in determining which identification device 72 in which casing 64 will be used to make the reader device 70 transmit actuation control signals through the tool control circuitry 120 to the detonator 74 (FIG. 3C).

Figure 5A:
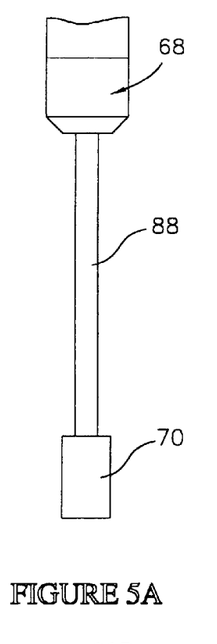
FIGS. 5A and 5B are schematic views illustrating exemplary spacer elements for spacing the reader device of the system from the perforating tool of the system.
Figure 5B:
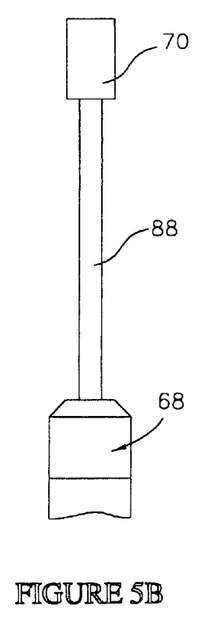

In order to provide proper timing for the detonation sequence, the velocity (V) of the perforating tool 68 and the reader device 70 can be selected as required. In addition, as shown in FIGS. 5A and 5B, a spacer element 88 can be used to space the perforating tool 68 from the reader device 70 by a predetermined distance (D). As shown in FIG. 5A, the perforating tool 68 can be above the reader device 70 (i.e., closer to the surface 60), or alternately as shown in FIG. 5B can be below the reader device 70 (i.e., farther from the surface 60).

As an alternative to a dynamic detonation sequence, the perforating tool 68 can be stopped when the required depth is reached, and a static detonation sequence performed. For example, the reader device 70 can be programmed to send a signal for stopping the perforating tool 68 when it reaches coupling C6. In this case, the signal from the reader device 70 can be used to control the wire line unit 92 and stop the wire line 90. The detonation and explosive sequence can then be initiated by signals from the tool control circuit 120, with the perforating tool 68 in a static condition at the required depth.

Figure 4B:
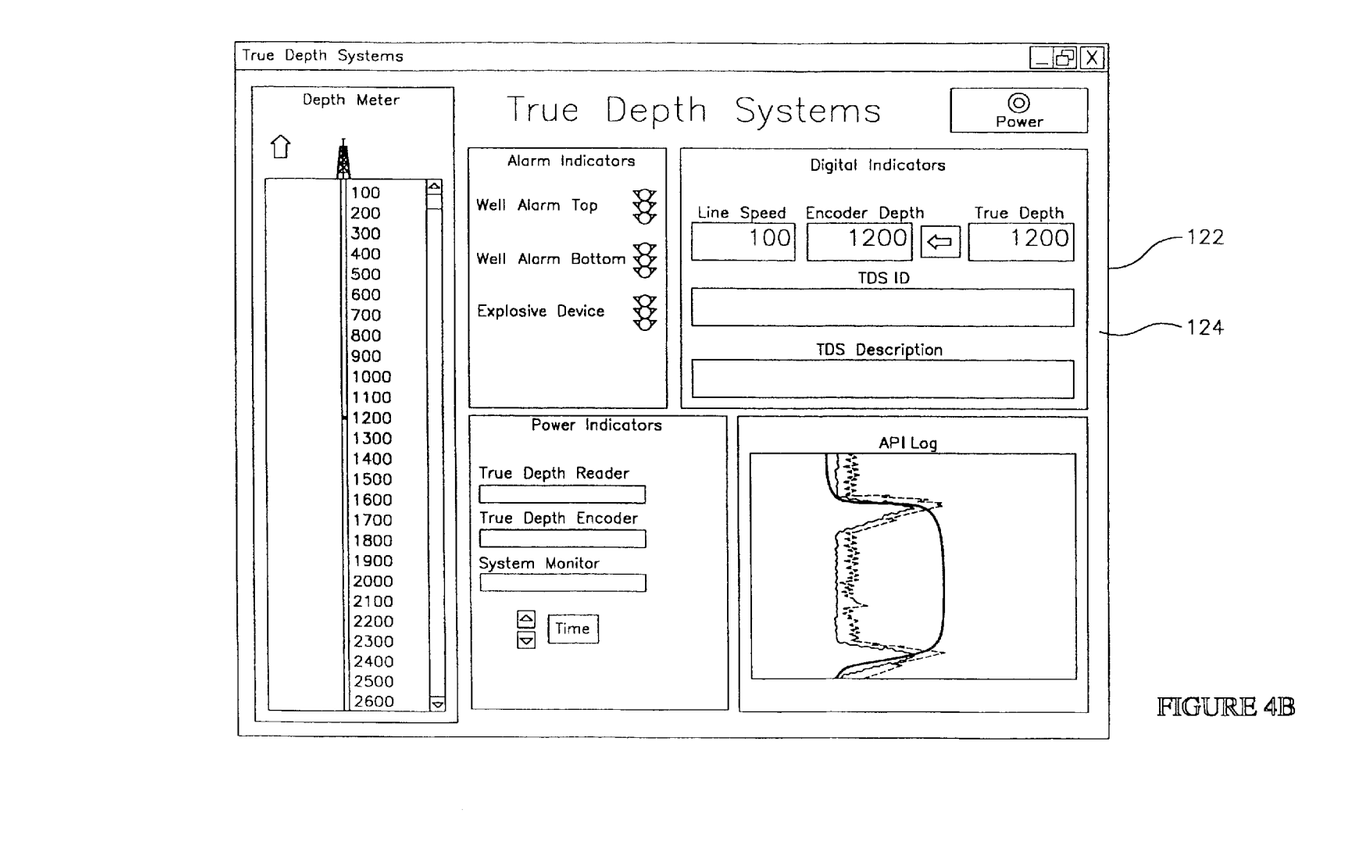
FIG. 4B is a view of a computer screen for a computer of the system.

As shown in FIG. 4B, signals from the reader device 70 can be used to generate a visual display 124, such as a computer screen on the computer 122, which is viewable by an operator at the surface. The visual display 124 is titled "True Depth Systems" and includes a power switch for enabling power to the reader device 70 and other system components. The visual display 124 also includes a "Depth Meter" that indicates the depth of the reader device 70 (or the perforating tool 68) within the well 52. The visual display 124 also includes "Alarm Indicators" including a "Well Alarm Top" indicator, a "Well Alarm Bottom" indicator, and an "Explosive Device" indicator. The "Alarm Indicators" are similar to stop lights with green, yellow and red lights to indicate varying conditions.

The visual display 124 also includes "Power Indicators" including a "True Depth Reader" power indicator, a "True Depth Encoder" power indicator, and a "System Monitor" power indicator. In addition, the visual display 124 includes various "Digital Indicators". For example, a "Line Speed" digital indicator indicates the speed at which the reader device 70, and the perforating tool 68, are being transported through the well casing 56. An "Encoder Depth" digital indicator indicates the depth of each identification device 72 as the reader device 70 passes by the identification devices 72. A "True Depth" indicator indicates the actual depth of the reader device 70 in real time as it is transported through the well casing 56.

The visual display 124 also includes a "TDS ID" indicator that indicates an ID number for each identification device 72. In addition, the visual display 124 includes a "TDS Description" indicator that further describes each identification device 72 (e.g., location in a specific component or zone). The visual display 124 also includes a "Time" indicator that can be used as a time drive (forward or backward) for demonstration or review purposes. Finally, the visual display 124 includes an "API Log" which indicates log information, such as gamma ray or SPE readings, from the previously described well logs, correlated to the "Digital Indicators" for depth.

Referring again to FIGS. 3A and 3B, in the embodiment illustrated therein, the transport mechanism 66W includes a wire line 90 operable by a wire line unit 92, substantially as previously explained and shown in FIG. 1. The wire line 90 can comprise a slick line, an electric line, a braided line, or coil tubing. If the controller 118, or the computer 122, is located at the surface 60, the wire line 90 can be used to establish signal communication between the reader device 70 and the controller 118 or the computer 122.

Figure 6A:
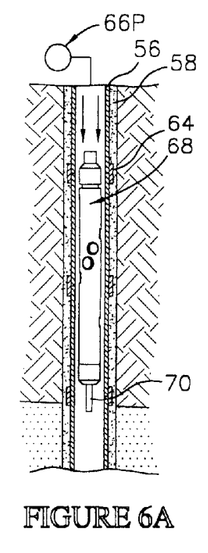
FIGS. 6A-6D are schematic cross sectional views illustrating various alternate embodiment transport mechanisms for the system.

Referring to FIGS. 6A-6D, alternate embodiment transport mechanisms for transporting the perforating tool 68 and the reader device 70 through the casing 56 are shown. In FIG. 6A, a transport mechanism 66P comprises a pump for pumping a conveyance fluid through the inside diameter of the casing 56. The pumped conveyance fluid then transports the perforating tool 68 and the reader device 70 through the casing 56. In FIG.

Figures 6B, 6C:
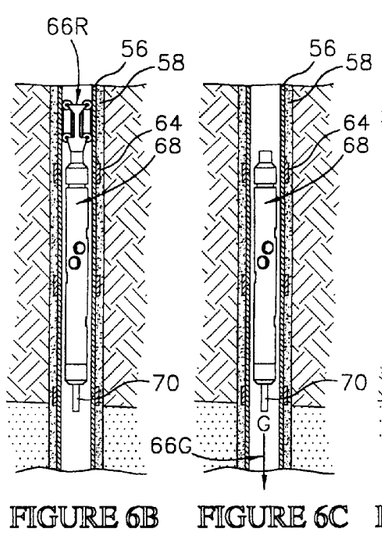
Figure 6D:
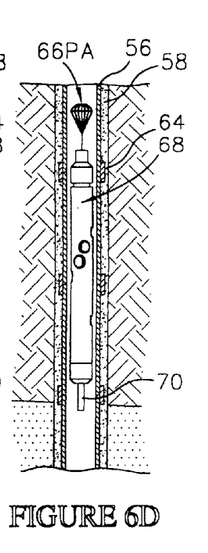

6B, a transport mechanism 66R comprises one or more robotic devices attached to the perforating tool 68 and the reader device 70, and configured to transport the perforating tool 68 and the reader device 70 through the casing 56. In FIG. 6C, a transport mechanism 66G comprises gravity (G) such that the perforating tool 68 and the reader device 70 free fall through the casing 56. The free fall can be through a well fluid within the casing 56, or through air in the casing 56. In FIG. 6D, a transport mechanism 66PA includes a parachute which controls the rate of descent of the perforating tool 68 and the reader device 70 in the casing 56. Again, the parachute can operate in a well fluid, or in air contained in the casing 56.

Figure 7A:
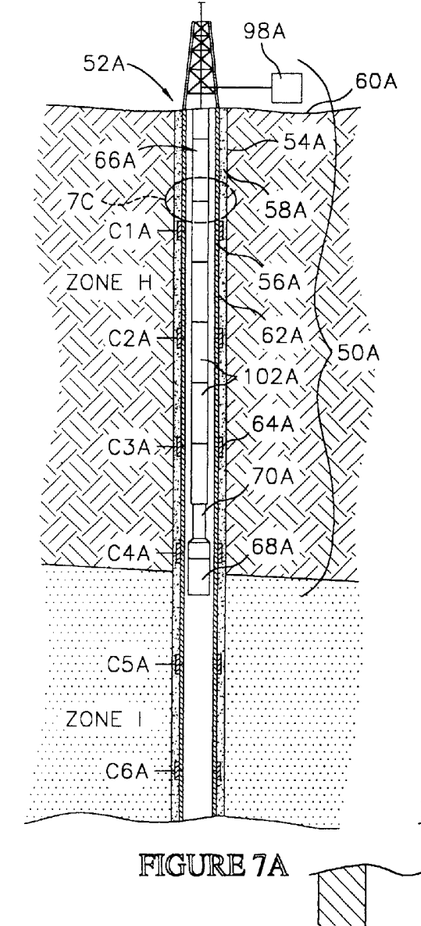
FIGS. 7A and 7B are schematic cross sectional views illustrating an alternate embodiment system constructed in accordance with the invention for performing a packer setting process in a well.
Figure 7B:
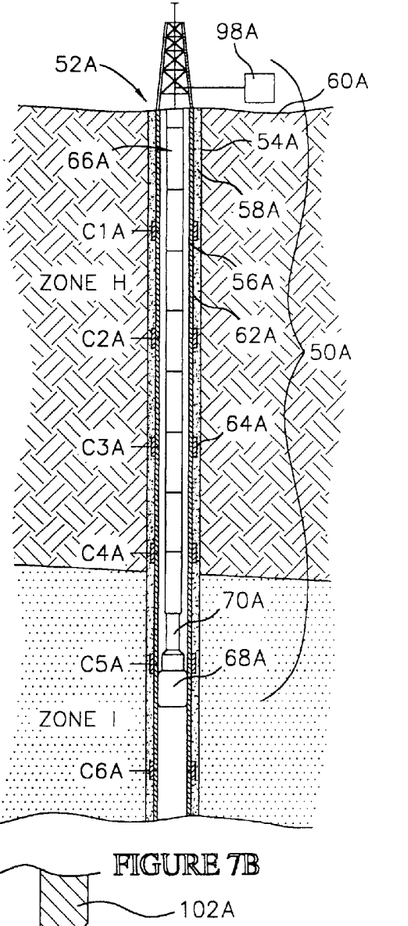
Figure 7C:
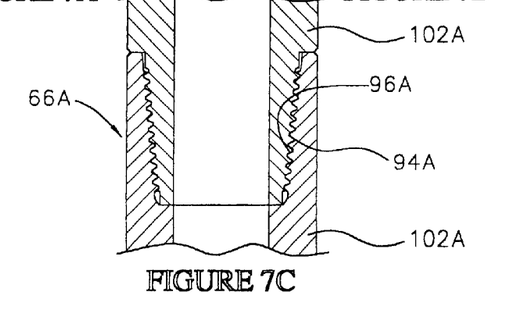
FIG. 7C is an enlarged portion of FIG. 7A taken along section line 7C illustrating a threaded connection of a tubing string of the alternate embodiment system.

Referring to FIGS. 7A-7C, an alternate embodiment system 50A constructed in accordance with the invention is illustrated. The system 50A is installed in a subterranean well 52A, such as an oil and gas production well. In this embodiment the system 50A is configured to perform a packer setting process in the well 52A.

The well 52A includes a well bore 54A, and a well casing 56A within the well bore 54A surrounded by concrete 58A. The well casing 56A comprises a plurality of tubular elements 62A, such as lengths of metal pipe or tubing, connected to one another by collars 64A. The well 52A extends from an earthen surface 60A through geological formations within the earth, which are represented as Zones H and I.

For performing the packer setting process, the system 50A includes a packer setting tool 68A, an inflation device 98A for the packer setting tool 68A, and a reader device 70A in signal communication with the packer setting tool 68A. In this embodiment, the inflation device 98A is located on the surface 60A such that a wire, or other signal transmission medium must be provided between the packer setting tool 68A and the inflation device 98A. The packer setting tool 68A can include an inflatable packer element designed for inflation by the inflation device 98A and configured to sealingly engage the inside diameter of the casing 56A. In FIG. 7B, the inflatable packer element of the packer setting tool 68A has been inflated to seal the inside diameter of the casing 56A proximate to Zone I.

The system 50A also includes a plurality of identification devices 72 (FIG. 3D) attached to the collars 64A on the casing 56A, and readable by the reader device 70A. In addition, the system 50A includes a transport mechanism 66A for transporting the packer setting tool 68A and the reader device 70A through the well casing 56A to Zone I. In this embodiment, the transport mechanism 66A comprises a tubing string formed by tubular elements 102A. As shown in FIG. 7C, each tubular element 102A includes a male tool joint 94A on one end, and a female tool joint 96A on an opposing end. This permits the tubular elements 102A to be attached to one another to form the transport mechanism 66A. In addition, the packer setting tool 68A can include a central mandrel in fluid communication with the inside diameter of the transport mechanism 66A.

The reader device 70A is programmed to transmit a control signal to the inflation device 98A upon actuation by a selected identification device 72 (FIG. 3D). For example, in the packer setting process illustrated in FIGS. 7A and 7B, coupling C4A is located proximate to the upper level, or entry point into Zone I. Since it is desired to inflate the inflatable packer element of the packer setting tool 68A while it is proximate to Zone I, the reader device 70A can be programmed to transmit the control signal to the inflation device 68A when it reaches coupling C4A. In this embodiment a spacer element 88A separates the packer setting tool 68A and the reader device 70A. In addition, the packer setting tool 68A is located downhole relative to the reader device 70A.

In order to insure that the packer setting sequence is initiated at the right time additional factors must be considered as previously explained. These factors can include the velocity (V) of the packer setting tool 68A and the reader device 70A, and the time required to inflate the inflatable packer element of the packer setting tool 68A. Alternately, the packer setting tool 68A can be stopped at a particular coupling (e.g., coupling C5A) and then inflated as required. In this case the reader device 70A can be programmed to transmit the control signals to the visual display 124 (FIG. 4B) on the surface 60A when the packer tool 68A passes a coupling 64A at the required depth. The operator can then control the inflation device 98A to initiate inflation of the packer setting tool 68A. Alternately the inflation sequence can be initiated automatically by the tool control circuit 120 (FIG. 4A).

In each of the described processes the method of the invention provides an improved well. For example, in the perforating process of FIGS. 3A and 3B, the well 52 can be perforated in the selected zone, or in a selected interval of the selected zone. Production from the well 52 is thus optimized and the well 52 is able to produce more fluids, particularly oil and gas.

Figure 8A:
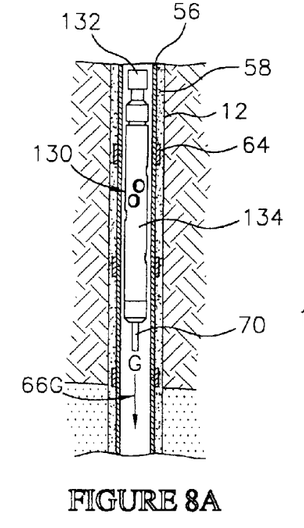
FIG. 8A-8C are schematic cross sectional views illustrating an alternate embodiment multi stage method and system of the invention for performing a packer setting and a perforating processes in combination.

Referring to FIGS. 8A-8C, a multi stage operation performed in accordance with the method of the invention is illustrated. Initially, as shown in FIG. 8A, a combination tool 130 is provided. The combination tool 134 includes a packer setting tool 132 and a perforating tool 134, which function substantially as previously described for the packer setting tool 68A (FIG. 7B), and the perforating tool 68 (FIG. 3A) previously described. In addition, the combination tool 134 includes the reader device 70 and the casing 56 includes identification devices 72 (FIG. 3D) substantially as previously described. As also shown in FIG. 8A, the combination tool 130 is transported through the casing 56 using the gravity transport mechanism 66G. Alternately, any of the other previously described transport mechanisms can be employed.

Figure 8B:
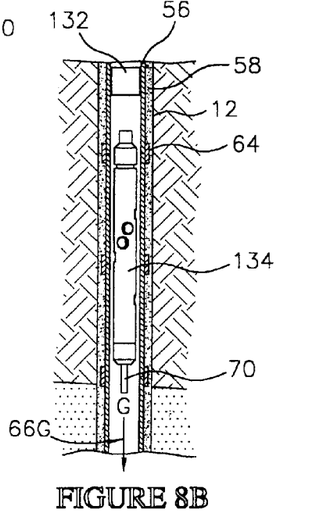

Next, as shown in FIG. 8B, the packer setting tool 132 is actuated such that an inflatable packer element of the tool 132 seals the casing 56 at a desired depth. In this embodiment the packer setting tool 132 is a self contained unit, with an integral inflation source. As with the previously described embodiments, the reader device 70 provides control signals for controlling the packer setting tool 132, and the packer setting process. For example, the inflatable packer element of the packer setting tool 132 can be inflated when the reader device 70 passes a selected coupling 64, and receives a response signal from the identification device 72 contained within the selected coupling 64. As also shown in FIG. 8B, the perforating tool 134 separates from the packer setting tool 132 and continues to free fall through the casing 56.

Figure 8C:
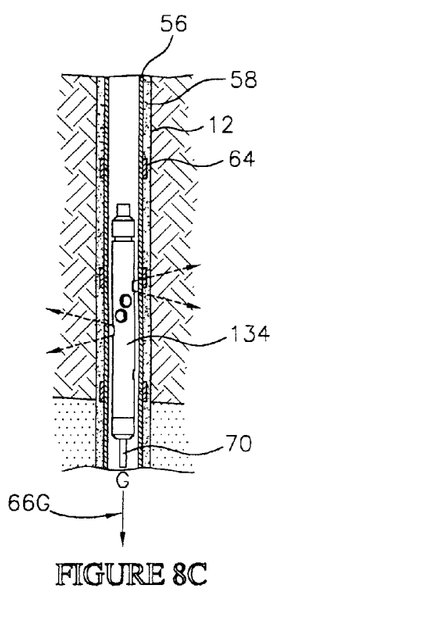

Next, as shown in FIG. 8C, the perforating tool 132 is controlled such that detonation and explosive sequences are initiated substantially as previously described. Again the reader device 70 provides control signals, for controlling the perforating tool 132 to initiate the detonation and explosive sequences at the proper depth. As indicated by the dashed arrows in FIG. 8C explosion of the charge assemblies 80 (FIG. 3C) of the perforating tool 134 forms openings in the casing 58 and the concrete 58.

Thus the invention provides a method and a system for performing various operations or processes in wells and for improving production from the wells. While the invention has been described with reference to certain preferred embodiments, as will be apparent to those skilled in the art, certain changes and modifications can be made without departing from the scope of the invention as defined by the following claims.

What is claimed is:

1. A method comprising:
   selecting a velocity at which a process tool and a reader device in signal communication with the process tool will be transported through a subterranean well having a plurality of radio frequency identification devices;
   determining one of said plurality of radio frequency identification devices to be used to make the reader device transmit control signals to actuate the process tool;
   programming the reader device to transmit control signals to the process tool upon receiving a signal from said one of said plurality of radio frequency identification devices; and
   transporting said process tool and said reader device through the well at said velocity.

2. The method of claim 1 wherein said process tool and said reader device are transported through the well by a wire line.

3. The method of claim 2 wherein the wire line is a slick line, an electric line, a braided line, or coil tubing.

4. The method of claim 1 wherein said process tool and said reader device are transported through the well by a pump.

5. The method of claim 1 wherein said process tool and said reader device are transported through the well by a robotic device.

6. The method of claim 1 wherein said process tool and said reader device are transported through the well by gravity.

7. The method of claim 1 further comprising:
   spacing the reader device a predetermined distance from said process tool.

8. The method of claim 1 wherein the process tool is a perforating tool.

9. The method of claim 1 wherein at least one of said velocity, a time period to transmit transmission signals to and receive response signals from any of said plurality of radio frequency identification devices, a second time period to transmit control signals to the perforating tool and a third certain time period before detonation and explosion of the perforating tool are considered in said step of determining said one of said plurality of radio frequency identification devices.

10. The method of claim 1 wherein said radio frequency identification devices are active radio frequency identification devices.

11. The method of claim 1 wherein said radio frequency identification devices are passive radio frequency identification devices.

12. The method of claim 1 wherein each of said plurality of radio frequency identification devices is configured to provide a response signal based upon said unique identifying information.

13. A system comprising:
   a process tool configured for transport through a subterranean well;
   a plurality of radio frequency identification devices located at spaced intervals at known depths in the well and configured to transmit response signals for uniquely identifying each radio frequency identification device;
   a reader device configured for transport through the subterranean well, for receiving the response signals from the radio frequency identification devices, and for controlling the process tool responsive to the response signals; and
   a device for connecting said process tool to said reader device at a predetermined distance from each other.

14. The system of claim 13 further comprising a transport mechanism configured to move the process tool and the reader device through the well.

15. The system of claim 13 wherein the reader device comprises a receiver for receiving the response signals and a transmitter for transmitting transmission signals to each of said plurality of radio frequency identification devices.

16. The system of claim 13 wherein the process tool comprises a perforating tool, the control signal controls a perforating process, and the predetermined distance is selected in order to provide proper timing for a detonating sequence.

17. The system of claim 16 wherein said perforating tool is above the reader device.

18. The system of claim 13 wherein the process tool comprises a packer setting tool and the control signal controls setting of a packer element.

19. The system of claim 13 further comprising a computer in signal communication with the reader device comprising a visual display generated using signals from the reader device.

20. The method of claim 13 wherein said radio frequency identification devices are passive radio frequency identification devices.

* * * * *